(No Model.) 2 Sheets—Sheet 2.
C. SALZBERGER.
PROCESS OF AND APPARATUS FOR DISINFECTING AND PURIFYING WATER.
No. 541,335. Patented June 18, 1895.
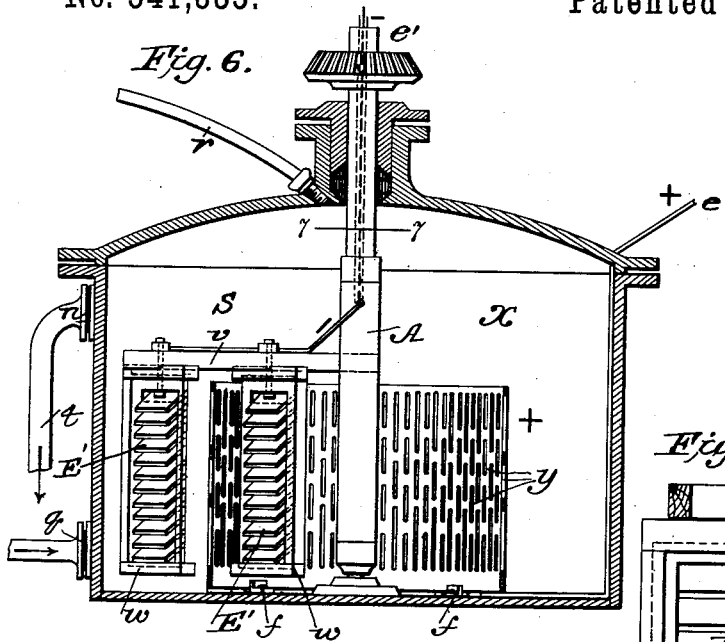
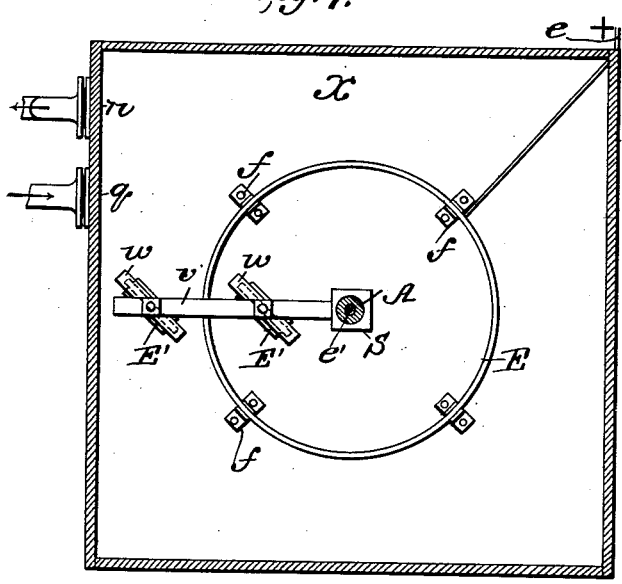
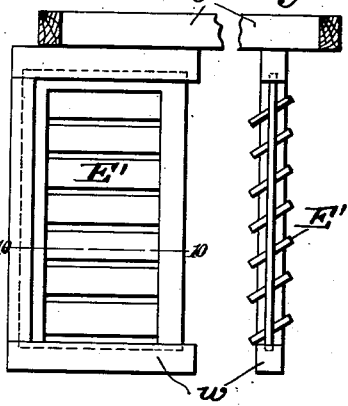
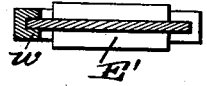
WITNESSES:
C. Sedgwick
INVENTOR
C. Salzberger.
BY Munn & Co.
ATTORNEYS.

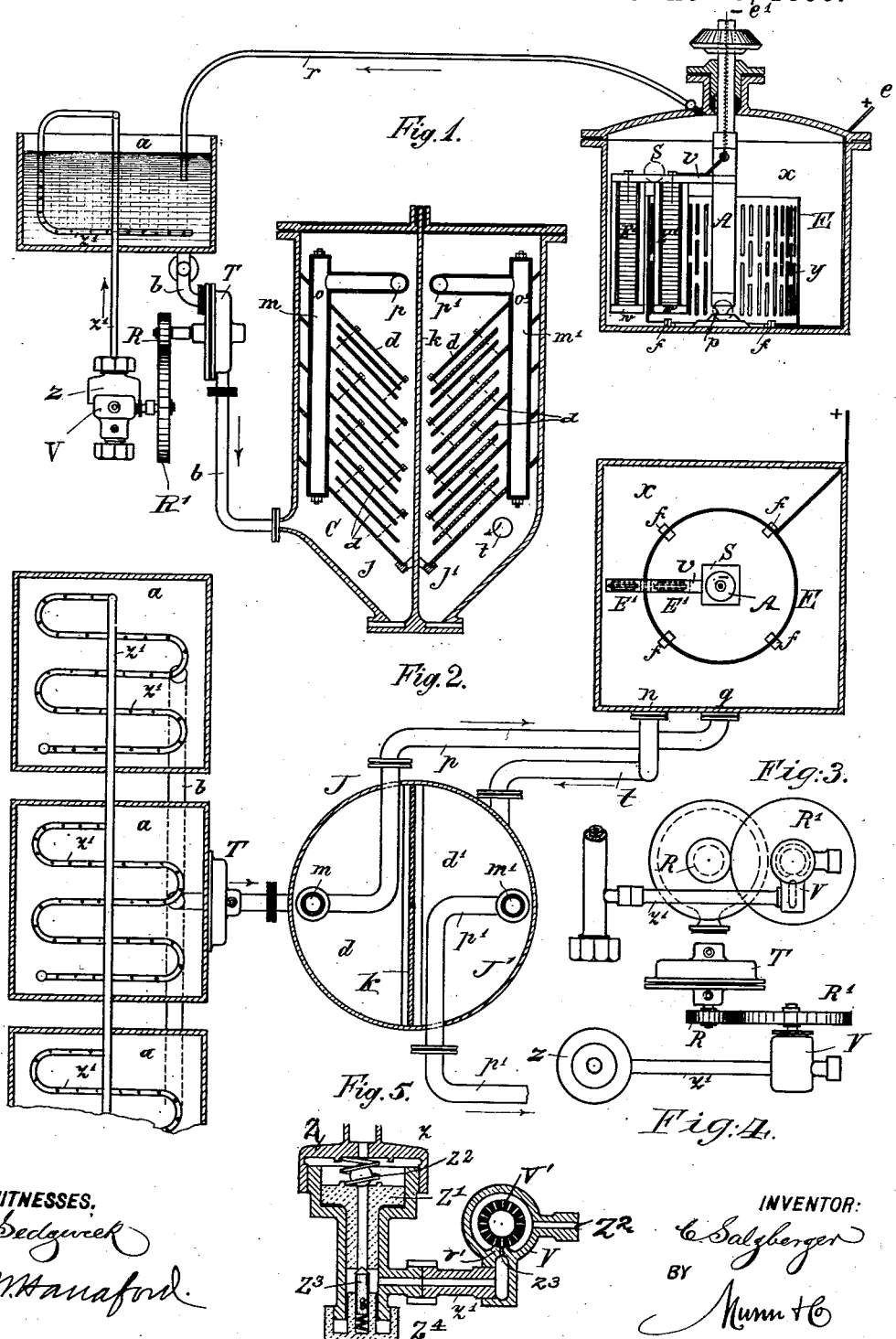

UNITED STATES PATENT OFFICE.

CARL SALZBERGER, OF BURGSTEINFURT, GERMANY.

PROCESS OF AND APPARATUS FOR DISINFECTING AND PURIFYING WATER.

SPECIFICATION forming part of Letters Patent No. 541,335, dated June 18, 1895.

Application filed February 24, 1894. Serial No. 501,422. (No model.)

*To all whom it may concern:*

Be it known that I, CARL SALZBERGER, a subject of the King of Prussia, German Emperor, residing at Burgsteinfurt, in the Kingdom of Prussia, Empire of Germany, have invented a new and Improved Process and Apparatus for Disinfecting and Purifying Water, of which the following is a full, clear, and exact description.

The object of the invention is to provide a new and improved process and apparatus for disinfecting and purifying water for domestic or industrial uses, in a very simple and comparatively inexpensive manner.

The improved process consists in first mixing the water with lime paste to purify it; then charging the mixture with carbon dioxide, and then subjecting the mixture to the action of an electric current to separate and set free the carbonate of lime and the carbon dioxide.

The apparatus consists in an electrolytical device, comprising a reservoir, an agitating device in the said reservoir and provided with movable slatted frames forming one of the electrodes, and a metallic perforated cylinder forming the other electrode.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a sectional side elevation of the apparatus. Fig. 2 is a sectional plan view of the same. Fig. 3 is an enlarged side elevation of the driving mechanism for the reducing-valve. Fig. 4 is a plan view of the same. Fig. 5 is an enlarged sectional side elevation of the reducing-valve. Fig. 6 is an enlarged sectional elevation of the electrolytic reservoir. Fig. 7 is a sectional plan of the same on line 7 7 of Fig. 6. Figs. 8, 9, and 10 are a front elevation, a side elevation, and a horizontal section on line 10 10 of Fig. 8, respectively, of part of the movable electrode.

The water derived from reservoirs, rivers or other places for the supply of towns or for other purposes, is first conducted into cisterns or tanks and there disinfected by means of lime paste. The water is thus purified in the tanks and is thence conveyed according to circumstances, by gravitation or by pumping to a series of reservoirs $a$ into which leads air pipe $z'$, the pipe having as many separate coils as there are reservoirs $a$ employed. The coils are placed near the bottom of each of the reservoirs $a$ and are perforated with numerous orifices for discharging carbon dioxide into the water contained in the reservoirs. The admission of carbon dioxide into the reservoirs $a$ filled with water saturated with hydrate of lime is continued until bicarbonate of lime is formed, after which, the water is drawn off from the reservoirs through an outlet pipe $b$ connected with all the reservoirs, the said pipe discharging the water holding in solution the bicarbonate of lime, into a vessel J containing a collecting pipe $m$ and sloping surfaces $d$ as plainly illustrated in Fig. 1.

The plates $d$ may be made of any suitable material, such as metal or wood. Their purpose is to throw down the impurities mechanically admixed to the solution. The pipe $m$ discharges into the pipe $p$ leading into another vessel X, the water entering the latter at $q$. See Fig. 2.

The water, on leaving the reservoir $a$ by the pipe $b$ flows through a small turbine T or similar device, by which the supply of carbon dioxide is regulated at the reducing valve $z$ proportionately to the volume of water in a manner fully set forth hereinafter. As shown in Figs. 1, 3 and 4, a valve casing V is interposed in the pipe $z'$ between the reducing valve $z$ and the reservoir $a$. In this valve casing is arranged a rotary valve V', which is driven by gear wheels R, R', from the shaft of the turbine T, and the said valve is provided with perforations, the number of perforations and rotary speed being such as to proportion the amount of carbon dioxide to the volume of water in the reservoirs A.

The valve V' is spaced from the casing V, so as to form therein an annular chamber into which leads the inlet pipe $z^2$. The casing is provided with an inward projection or lug $v'$, provided with a perforation $z^3$ serving as an outlet to the pipe $z'$. The gas therefore will enter the annular chamber of the casing from the pipe $z^2$, then pass inward through the perforations of the valve V' into the central chamber thereof, and finally pass out at intervals through the perforations of the valve as they successively come into registry with the outlet $z^3$. In this manner I am enabled to supply exactly the required quantity of gas. Should the apparatus be used for a quantity of water different from the usual quantity, the gear wheels R R' are removed and others substituted so as to give the proper rotary speed to the valve V' to proportion the supply of gas to that of water. The reducing valve $z$ to which the gas passes from the outlet $z^3$, may be of any usual construction, and as illustrated comprises an apertured cover Z in which slides a perforated piston Z' controlled by a coiled spring $Z^2$. The aperture in the piston is adapted to be closed by a spring-pressed stem $Z^3$ having limited sliding movement in a socketed cap $Z^4$. The pressure of the gas issuing at the outlet $z^3$ will move the piston Z' until the stem $Z^3$ is no more in contact with the piston, and thus allows the gas to escape through the piston.

In the second vessel X the bicarbonate of lime dissolved in the water and which is prejudicial to health, is eliminated by an electrolytical process presently to be described.

The vessel X is fitted with an agitating apparatus S provided with a perforated cylinder E fastened in place in the vessel by braces or feet $f$ in the bottom of the vessel, the cylinder being provided with a large number of long vertical slits $y$ distributed over the entire wall of the cylinder. The agitating apparatus S is provided with a central revolving shaft A disposed vertically in the vessel and centrally in the cylinder E, and from this shaft extends horizontally an arm $v$ supporting two frames $w$ of which one extends on the inside of the cylinder E and the other on the outside thereof, as plainly shown in Figs. 1 and 6.

The frames $w$ (see Figs. 8, 9 and 10) are provided with plates E' in the shape of Venetian slats which, in conjunction with the cylinder E, form electrodes, the cylinder being made of aluminum and the slats preferably of carbon. The openings in the electrodes serve to provide an extensive surface of contact between the water and the electrodes, which latter are connected through the vessel, the arm $v$ and shaft with the wires $e$ and $e'$ of a dynamo or with another source of electricity supply. The wire $e'$ is insulated where it passes through the shaft, as indicated in Fig. 6.

The agitating device S is intended to set the water in brisk motion during the passage of the electric current, so as to prevent the carbonate of lime and the carbon dioxide formed during the process from forming a deposit or being precipitated on the surface of the electrodes, which deposit would weaken the efficiency of the electrodes. The water now mixed with monocarbonate of lime passes off through the opening $n$ and passes through a pipe $t$ into the vessel J' forming part of the vessel J, but divided therefrom by a transverse partition $k$, as plainly shown in Figs. 1 and 2. The water entering the second vessel J' passes over the sloping surfaces $d'$ and after complete and thorough purification, the water passes through the openings first into the collecting pipe $m'$ to finally flow through the pipe $p'$ to the service pipe, water main or other device for distributing the water to the town or other place. A small pipe $r$ leads from the vessel X to the reservoirs $a$, so as to conduct the carbon dioxide set free in the said vessel X back to the reservoirs $a$ to be reused with the lime water.

Having thus fully described my invention, I claim as new and desire to secure by Letters Patent—

1. The herein described process for disinfecting and purifying water, consisting in first mixing the water with lime paste, then charging the mixture with carbon dioxide to form bicarbonate of lime, and then subjecting the mixture to the action of an electric current to decompose it and set free carbonate of lime and carbon dioxide, substantially as shown and described.

2. An apparatus for disinfecting and purifying water, provided with an electrolytical device, comprising a reservoir or vessel, a perforated metallic cylinder set in the said vessel and forming one of the electrodes, and a movable slatted frame forming the other electrode and constructed in two parts arranged on the inner and outer surface of the said cylinder, substantially as shown and described.

3. An electrolytical device, comprising a reservoir or vessel, a hollow cylindrical electrode set in the said vessel, and a rotatable electrode consisting of two parts arranged respectively on the inside and outside of the cylindrical electrode, substantially as described.

4. In an apparatus for disinfecting and purifying water, the combination, with a water reservoir, a water conveying pipe connected thereto, and a rotary water motor located in the said pipe so as to be actuated by the flow of the water, of a fluid conveying pipe connected to the water reservoir to supply the same with a fluid to be admixed to the water, a rotary valve in the said fluid conveying pipe, a driving connection between the water motor and the said rotary valve, to proportion the amount of fluid conveyed to the volume of water passing through the said motor, and an electrolytical apparatus connected to the water reservoir to receive therefrom the mixture of water and fluid substantially as described.

5. An apparatus for disinfecting and purifying water, comprising a series of reservoirs containing water charged with lime paste, a reducing valve having an outlet pipe provided with perforations, extending into the said reservoirs to discharge carbon dioxide into the water contained in the reservoirs, a vessel into which discharge the said reservoirs and provided with sloping plates, and an outlet pipe, and a second vessel into which discharges the first vessel, the said second vessel being provided with a perforated cylinder forming one electrode and movable slat frames forming the other electrode, substantially as shown and described.

6. An apparatus for disinfecting and purifying water, comprising a series of reservoirs containing water charged with lime paste, a reducing valve having an outlet pipe provided with perforations, extending into the said reservoirs to discharge carbon dioxide into the water contained in the reservoirs, a vessel into which discharge the said reservoirs and provided with sloping plates and an outlet pipe, a second vessel into which discharges the first vessel, the said second vessel being provided with a perforated cylinder forming one electrode and movable slat frames forming the other electrode, and a third vessel having sloping plates into which discharges the said second vessel, substantially as shown and described.

In testimony whereof I have signed my name to this specification in the presence of two subscribing witnesses.

CARL SALZBERGER.

Witnesses:
H. F. MERRITT,
C. A. PARKE.